July 14, 1942.  G. M. BOOTH  2,289,333
HYDRAULIC MOTOR AND CONTROL APPARATUS
Original Filed May 5, 1937   2 Sheets-Sheet 1

INVENTOR
George Martin Booth
BY
Cooper, Kerr & Dunham
ATTORNEYS

July 14, 1942.  G. M. BOOTH  2,289,333
HYDRAULIC MOTOR AND CONTROL APPARATUS
Original Filed May 5, 1937   2 Sheets-Sheet 2
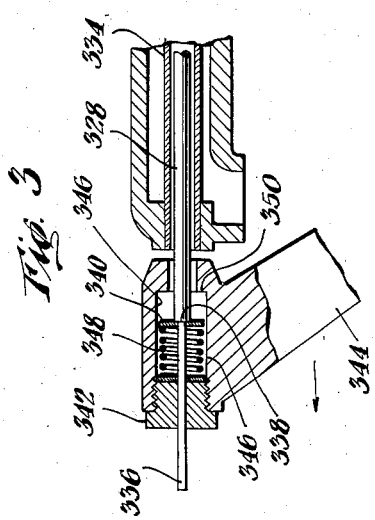
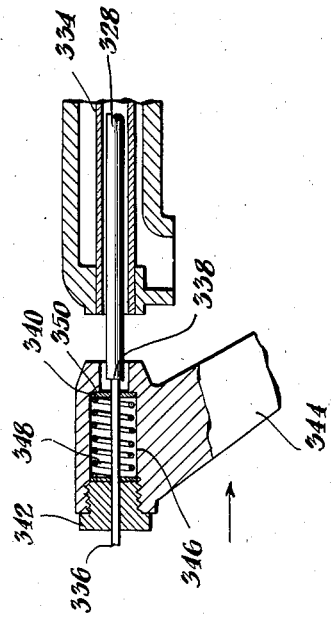
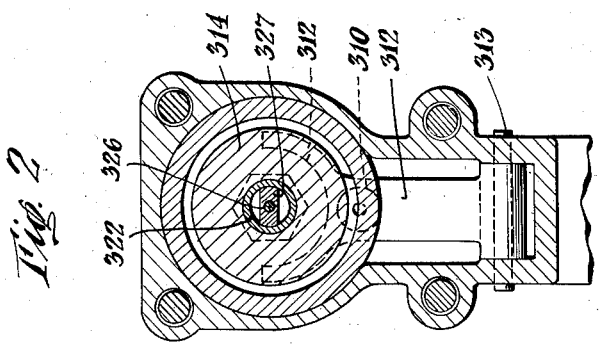
INVENTOR
*George Martin Booth*
BY
*Cooper, Kerr & Dunham*
ATTORNEYS Patented July 14, 1942

2,289,333

UNITED STATES PATENT OFFICE 2,289,333

HYDRAULIC MOTOR AND CONTROL APPARATUS

George Martin Booth, Westfield, N. J., assignor to Wallace & Tiernan Co. Inc., Belleville, N. J., a corporation of New York Original application May 5, 1937, Serial No. 140,813. Divided and this application June 23, 1939, Serial No. 280,775

10 Claims. (Cl. 121—157)

This invention relates to hydraulic apparatus, particularly liquid feeding devices, and in one important aspect, relates to apparatus for feeding into a body of liquid under pressure, for example water as contained in a supply main, desired quantities of a treating liquid. In purifying the water of an ordinary supply system, as for towns, villages, hotels, or homes, it has been found that good results are obtained by the regular introduction of small quantities of a chlorinating liquid, such as a suitable hypochlorite solution. A principal object of the present invention, therefore, is to provide simple, efficient, and inexpensive apparatus for effecting such introduction of hypochlorite solution for the purification of water as carried under pressure in a main.

It may be explained that this invention provides a more efficient and dependable feeding service than is obtained with other pumping arrangements, such as of the plunger or piston type, or of other types wherein continuously rotating valves or sliding valves or the like are employed; for example, in systems of that character accuracy of pumping is directly dependent upon the fit or packing of one or more sliding or rotating valves or pistons, which are not only difficult to manufacture with the necessary accuracy, but are apt to leak, or set up friction losses, or become otherwise unreliable.

Other objects are to provide liquid feeding apparatus having new and improved arrangements for the operation or control of reciprocating devices therein; to provide hydraulically operated driving means, suitable for the operation of such devices, and simple and efficient in character; to provide dependable and efficient hydraulically operated driving apparatus which is conveniently free from pistons, rotating valves or like parts requiring a sliding fit under pressure and therefore having disadvantages of the character noted hereinabove; to provide improved liquid feeding apparatus as described, which is adapted to be driven by the force of liquid under pressure, and is conveniently free of elements having the disadvantages of sliding fit as just explained; to provide apparatus improved in the foregoing or other respects, which is adapted to deliver the treating liquid at a rate automatically proportional to the rate of flow of the main body of liquid; and to provide new and improved hydraulic, i. e. liquid-operated, driving apparatus, and new and improved control means for such apparatus.

Other objects and advantages include those hereinafter stated or apparent in connection with the following description of certain presently-preferred embodiments of the invention. These embodiments, which are set forth by way of example, are illustrated in the accompanying drawings, wherein:

Fig. 2 is a sectional view on line 2—2 of Fig. 1; and

Figs. 3 and 4 are fragmentary sectional views of a portion of the apparatus in Fig. 1, with certain parts in respectively different positions.

Figure 1:
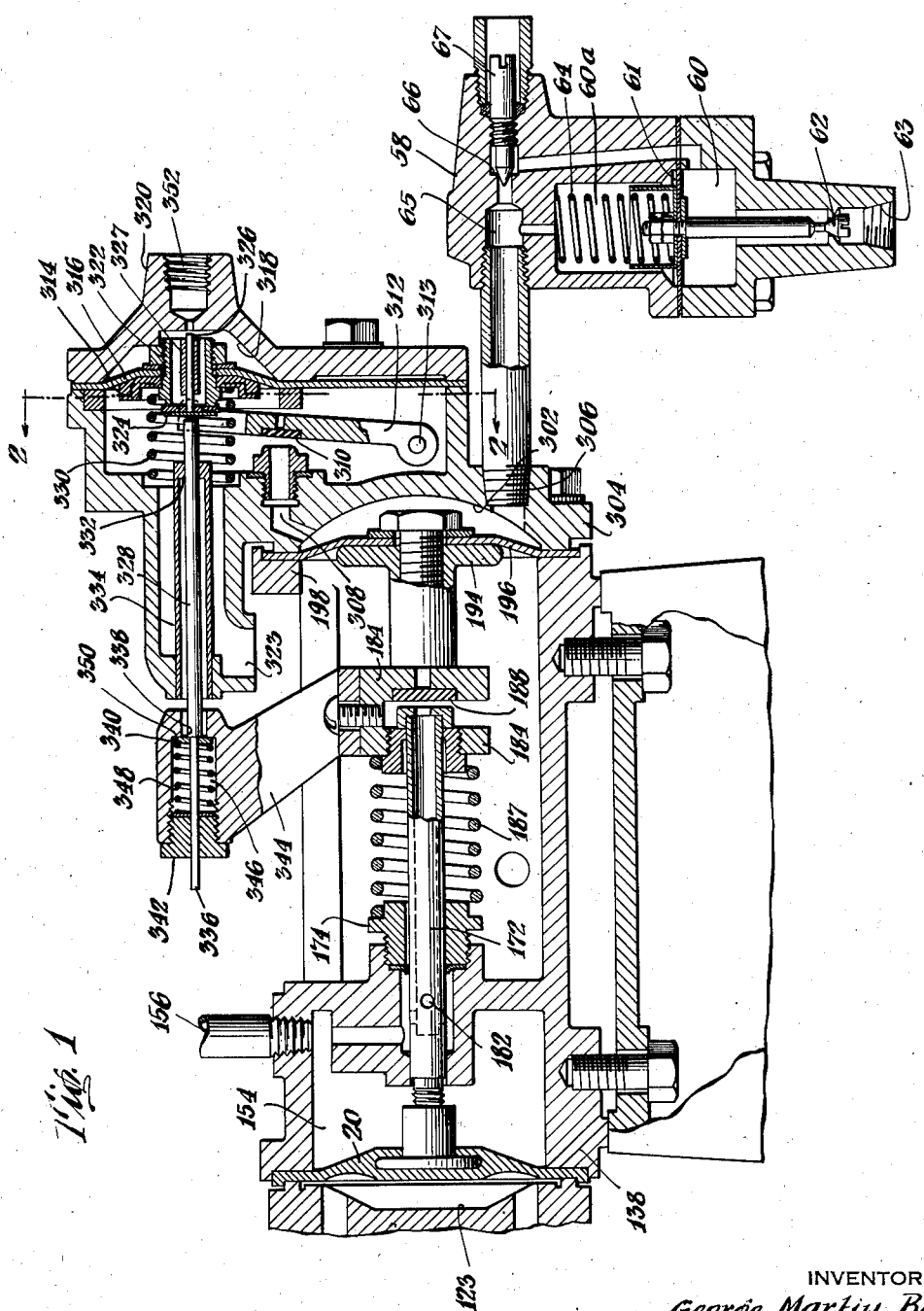
Figure 1 is a vertical view, chiefly in section along a central vertical plane, of one form of the apparatus.

It may be explained that the apparatus shown in these figures is conveniently adapted to withdraw treating liquid (e. g., hypochlorite solution) from a nearby tank, and to deliver desired quantities thereof into a water main where the pressure may be relatively high, for example, as high as 100 pounds per square inch, or in many cases, considerably higher.

The apparatus of Fig. 1 includes a pumping element comprising a circular flexible diaphragm 20, advantageously made of resilient material, such as rubber. Against this diaphragm there is seated a block having a circular recess 123 disposed toward the diaphragm, to provide a pumping chamber. Treating fluid is admitted to and discharged from the latter through suitable means, not shown.

The main supporting structure of the apparatus may comprise a main frame or body 138, having a recessed portion to provide a balancing chamber 154 for the diaphragm 20, with an input port 156 for a flow of water under pressure. To reciprocate the diaphragm 20, the latter is connected to a tube 172, which slides in a sleeve 174 and has an aperture 182 for conducting water from the chamber out through the outer or right-hand end of the tube. A frame or bracket 184 is associated with the outer end of the tube, to provide a valve arrangement therefor and to transmit reciprocating force thereto. The frame 184 is mounted to slide horizontally (in the direction of the axis of the tube 172) on suitable guide rods, not shown, and includes a sleeve or bushing slidably fitting the tube 172 so that upon displacement of the frame 184 to the left, a resilient disk 188 is closed against the end of the tube, and the displacing force of the frame is thereafter transmitted to the diaphragm 20. A coil spring 187, disposed about the tube 172 intermediate the frame 184 and sleeve 174, is adapted to urge the frame 184 to the right, and with it the diaphragm 20 upon engagement of the frame-carried bushing with a shoulder at the end of the tube 172 (as shown in Fig. 1).

The traveling frame 184 has a rightwardly-extending portion terminating in a head 194 bolted to the central portion of a driving diaphragm 196, which encloses a driving or motor chamber 302 provided by a cup-shaped recess in the housing member or frame 304. The chamber 302 has a water inlet port 306, and a water outlet port 308. Water is continuously supplied to chamber 302 through the input 306, e. g. from a water main, and a differential valve 58 is conveniently provided in this supply line, i. e., to provide a substantially constant flow of water to the supplied chamber.

The differential valve 58 may be of suitable known construction, adapted to provide a substantially uniform flow of water to the chamber 302 from the main. The valve here shown includes to that end, adjacent chambers 60, 60a, separated by a diaphragm 61 which carries a valve closure 62 for the inlet 63 to the chamber 60 and which is biased toward open position of valve 62 by a spring 64. The chamber 60 is connected with the outlet 65 and the chamber 60a through an orifice 66 which is adjustable by means of the threaded member 67. As will now be understood, the pressure differential between chambers 60, 60a, is a function of the force exerted by the spring 64 on the diaphragm and is substantially constant, and in consequence, the flow through orifice 66 is substantially constant for any given setting of member 67, irrespective of variations in pressure, within certain limits, at the inlet 63 or the outlet 65.

The outer end of the water outlet 308 is adapted to provide a seat for a valve disc 310 of resilient material carried by a lever 312 which is pivoted at its lower end, at 313, to the frame 304, and which may rock to the right, to open the valve thus provided, or to the left to close the valve disc 310 against the port 308 and prevent escape of water from the chamber 302. Referring also to Fig. 2, the upper end of the lever 312 is forked, and the ends of the fork are adapted to abut (on the other side of the member 312 from the valve disc 310) against an annular plate 314 carried by a diaphragm 316 which encloses a control chamber 318 recessed in the member 320; the diaphragm 316 being peripherally secured between the member 320 and a cooperating annular ring which is secured by a portion of the frame 304.

The diaphragm 316 is pierced by a bushing or tubular member 322, adapted for passage of water from the chamber 318 to the other side of the diaphragm, and thence to waste through outlet 323. The outer or left-hand end of the bushing 322 is adapted to provide a seat for a resilient valve disc 324 carried by a pin 326 which is slidably mounted and aligned in a transverse block 327 in the bushing. As shown in Fig. 2, this block does not interrupt flow of water through the bushing 322 when the valve (constituted by disc 324 and the end of the bushing) is opened, and the valve pin 326 is freely slidable in the block, to permit opening or closing of the valve. The outer surface of the valve disc 324 is provided with a suitable metal face and the assembly is adapted to be engaged on that side by the end of a controlling rod 328. A spring 330 interposed between the annular member 314 carried by the diaphragm and the frame 304, normally urges the diaphragm 316 to its right hand position shown, so that the member 312 may then rock back, with its upper forked extremity resting upon the annular member 314, and thus permit the valve 310 to open. The control rod 328 is supported and freely horizontally slidable in a bushing 332 at the end of a tube 334 which is secured to a leftwardly extending portion of the frame 304 as shown in Fig. 1.

The outer left hand end of the rod 328 has a reduced portion 336 so as to provide a leftwardly-facing shoulder 338 which is adapted to abut a washer 340, the latter being freely slidable upon or relative to the reduced portion of the rod. The left hand extremity of the reduced portion of the rod 336 is freely slidable in, and supported by, a bushing 342 carried by an upwardly extending support 344 which is secured to, and displaceable with, the pump-operating frame 184. The bushing 342 is seated partly into a cylindrical recess 346 formed in member 344 and surrounding the operating rod 328—336, and within this recess there is disposed a spring 348 which is seated against the inner face of the bushing 342 and is adapted to urge the washer 340 to the right against the shoulder 338 of the rod 328, or against an inwardly extending shoulder 350 near the right hand end of the recess, depending, as will presently be explained, upon the position of the assembly 184—344, relative to the stationary portion of the apparatus.

Inlet of water to the control chamber 318 is provided through a port 352, conveniently connected to the main through a reducing valve of suitable known construction (not shown), so as to reduce the pressure to no more than that needed for proper rapid action of the control chamber as hereinafter explained, and so that waste of water is avoided, both directly when valve 324 is intended to be open, and by bleeding through this valve at other times.

It will be understood that port 156 is connected with the water main through a suitable differential valve as explained in my copending applications hereinafter identified. It will also be understood that the operation of the pumping and diaphragm-balancing instrumentalities, upon reciprocation of frame 184, is the same in the apparatus here shown as in other apparatus shown in my said copending applications, at the beginning of each pumping stroke valve 183 is closed so as to build up balancing force in the chamber 154, and at the end of each stroke the valve is permitted to open by preliminary movement of the frame 184 to the right, so that as the spring 187 thereafter carries the entire assembly to the right, there is no balancing force exerted by chamber 154 and a rapid return stroke is achieved. The operation of the hydraulic motor of the illustrated form of apparatus, whereby the frame 184 is positively driven to the left to provide the pumping strokes, will now be described.

It may be assumed that the pumping apparatus has just completed a return stroke to the right, and the parts are consequently in the position shown in Fig. 1, with the valve 310 open and no displacing force being exerted upon diaphragm 196. At this point of operation, the rightward travel of members 184 and 344 has brought the washer 340 into such engagement with the shoulder 338 of rod 328 that the right hand end of the rod is pushed against the valve disc 324, closing the valve as the shoulder 350 tends to move ahead, and clear, of washer 340. Thereupon the water which is flowing into the small control chamber 318 (and which has previously been escaping through bushing 322) immediately exerts displacing force upon the diaphragm 316 and moves the latter to the left. This movement of the diaphragm 316, against spring 330, moving rod 328 to the left against spring 348, is preferably so rapid as to be almost instantaneous. The effect of so displacing the diaphragm 316, and, in consequence, its ring 314, rocks the arm 312 to the left, closing valve 310 and keeping it closed; the rapid movement of the diaphragm thus providing a snap closing action for the valve 310.

With the valve 310 closed the water flowing into the motor chamber 302 immediately backs up and begins to displace the diaphragm 196 to the left. The left hand end of rod 328—336, and the associated parts carried by member 344, are now in the position shown in Fig. 3, and during the entire pumping stroke which is now proceeding, the spring 348, acting through washer 340 upon the shoulder 338 of the rod 328, keeps the valve 324 closed, so as to maintain the diaphragm 316 in its displaced position, and thereby to keep the valve 310 closed.

The water now flowing into chamber 302 thus continues to displace to the left the diaphragm 196, and the attendant pumping instrumentalities operated by frame 184, for the pumping stroke. At the same time, the member 344 is moving to the left relative to the rod 328, and eventually the washer 340 (urged to the right by the spring 348) comes into engagement with shoulder 350. The pressure exerted upon the rod 328 is thereupon immediately released, and since the closing pressure on valve 324 is consequently and by the same token released, this valve opens itself, and the diaphragm 316 immediately jumps back to its original position (shown in Fig. 1), since no displacing force is now exerted upon it. Likewise the valve 310 opens itself under the pressure of the water in chamber 302, since member 312 is now free to rock to its original right hand position shown in Fig. 1; the force on diaphragm 196 is thus relieved and the water flowing into chamber 302 passes on through ports 308 and 323, to waste.

The force of spring 187, compressed during the pumping stroke, now carries the pump-operating instrumentalities to the right for the return stroke. At the same time, the rod 328 is now free and loose, because of the space left in front of it by the return of diaphragm 316, and remains free and loose during the entire return stroke. The positions of the left hand end of the rod and of the parts carried by member 344, just after the commencement of the return stroke, are shown in Fig. 4.

Eventually, however, the washer 340, held by shoulder 350 during the return stroke, again engages the shoulder 338 of the rod 328 and pushes the latter against the valve disc 324. This constitutes the end of the return stroke, since the parts now repeat the operations previously described—i. e., with valve 324 closed, diaphragm 316 jumps to the left, valve 310 is closed, and pressure begins to build up in chamber 302, commencing another pumping stroke. The cycle of pumping operations thereupon proceeds as before.

It will be seen that the arrangement shown provides a simple and convenient hydraulically operated liquid feeding apparatus, wherein the control of water supply to the driving chamber 302 is automatically positively exercised at the desired points in the travel of frame 184, to initiate the pumping and return strokes respectively—i. e., the control in each direction being exercised in response to arrival of the member 184 at the position at which the diaphragm 316, rod 328 and associated instrumentalities are adapted to effect such control. It will be noted, moreover, that the apparatus is efficiently adapted, because of the relatively very rapid return or suction stroke effected by the spring 187, to approximate closely a continuous feed of treating liquid into the main.

A particularly convenient way of controlling the delivery of the pump in this form of the apparatus is by adjustment of the differential valve 58 which may be provided in the supply line between the main and the motor chamber inlet 306. It will be understood that such valve, which is adapted to provide a substantially constant flow, should preferably have a wide range of adjustment, so that the rate of flow into the motor chamber may be correspondingly adjusted over a wide range and substantial variation of pump delivery obtained as desired. Thus upon increase or decrease of the flow into the motor chamber 302, there will be respectively a decrease or increase in the duration of the pumping stroke, to expel the same unchanged amount of treating liquid, and in consequence, over any period of time, there will be a corresponding increase or decrease of the actual rate of delivery of treating liquid.

If desired, the apparatus of Fig. 1 may in many cases be made to deliver treating liquid automatically in proportion to the flow in the main, by creating a minor flow from the latter (for example, by means of the well known arrangement, for setting up a proportional minor flow, which includes a Venturi tube in the main) and by supplying such minor flow to the inlet port 306 of the motor chamber 302, in lieu of the manually adjusted supply just described. Since the pump delivery is adapted to vary automatically in proportion to variations in flow to the motor chamber (as just explained), and the minor flow varies in proportion to variations in the flow of the main, the feed of treating fluid, over a given period of time, will thus automatically vary in proportion to the flow variations of the main. It will be understood that in most cases, since the pressure necessary to operate the hydraulic motor is much less than that to be developed by the pump (because of the balancing chamber arrangement), the pressure in the minor flow will be ample for operation of the motor.

It will now be appreciated that the present invention, as illustrated by the embodiment thereof hereinabove described, well attains its stated objects, and affords liquid feeding apparatus which is especially rugged, dependable, long-lived and so simple to use that unskilled persons may readily supervise its operation and make any necessary adjustment of its rate of delivery. The efficiency of the apparatus is high throughout, and parts which have a rotating or other necessarily stiff sliding fit and upon which pumping accuracy depends may be, as they are in the described embodiment, satisfactorily eliminated; for example, all of the described control valves in the forms shown are in effect friction-free, and are generally, and to like advantage, self-opening upon release of the associated control element in each instance. The arrangements are also such as to attain a high degree of efficiency, accuracy and reliability with a diaphragm pump in which only a minimum of working parts need be exposed to the treating liquid, and which is in that and other respects so constructed that all elements exposed to such liquid may, if desired, be readily and effectively made of a material resistant to attack by the liquid.

It is to be noted that while the apparatus specifically illustrated has been described as employing a balancing force on the diaphragm opposite to the pumping surface, which is substantially equal to the force required for pumping, but is in fact slightly less than the latter, it is not essential that it be less; the balancing force may be either greater or less than that required for pumping, depending, for example, upon the specific arrangement of the apparatus. For instance, if the balancing chamber is connected to a separate liquid supply of higher pressure than that of the main into which treating liquid is to be fed, or if an orifice is used in the main to produce a friction loss and the balancing water is taken at a point ahead of the orifice and the treating liquid injected below the orifice, the balancing force may exceed that needed for pumping and no liquid-expelling force may be required of the diaphragm driving or reciprocating instrumentalities which serve to control the balancing chamber valve or the speed, frequency or length of pumping strokes. Of course it will be understood that in some cases satisfactory results may be had when the balancing force is very considerably less than the required pumping force; and also when it is considerably greater.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

This application is a division of my co-pending application, Serial No. 140,813, filed May 5, 1937, for Liquid feeding apparatus.

In my said application Serial No. 140,813 and in my copending application Serial No. 189,533, filed February 9, 1938, for Liquid feeding apparatus (likewise a division of my said application Serial No. 140,813), certain features and combinations herein illustrated or described are being claimed, including: the balanced diaphragm pumping arrangement and its control parts, liquid feeding apparatus having means for balancing a pumping diaphragm during pumping strokes and also having hydraulic driving means, and the combination of liquid feeding apparatus having pumping, driving and control diaphragms with associated balancing, driving and control chambers adapted to be supplied with liquid under pressure; and likewise proportional feeding apparatus having a feeding device and hydraulic reciprocating drive with flow-responsive means for control of the drive, as by regulating the rate of advance of each stroke, in proportion to a controlling flow.

What I claim is:

1. In combination, a hydraulically displaceable member, conduit means shiftable therewith for conducting liquid through the member, a closure member shiftable oppositely to the direction of hydraulic displacement of the first-mentioned member, for closing said conduit means to effect hydraulic displacement of the member, means adapted to resiliently engage said closure member for displacing the same into conduit-closing position and for maintaining the closure member in said position against resulting hydraulic displacement of the first-mentioned member, hydraulically reciprocable means having a controlling valve therefor adapted to be closed by displacement of the first-mentioned member, means responsive to the position of said reciprocable means for bringing said closure member engaging means into play when the reciprocable means is in one position and for positively releasing operation of the closure member engaging means when the reciprocable means is in another position, means for supplying liquid under pressure against the first-mentioned member to displace the same upon closure of the said conduit means, and means for supplying liquid under pressure to the hydraulically reciprocable means for operation thereof under control of said valve, said first-mentioned member having means for returning same upon release of operation of the closure-member engaging means, and said reciprocable means including means for returning same upon release of liquid pressure therein.

2. Hydraulic motor apparatus comprising, in combination, a driving member, means for reciprocating the same, including means for hydraulically displacing the member in one direction, means for returning the member in the opposite direction, liquid supply means for the hydraulic displacing means, and means for controlling the operating effectiveness of liquid supplied thereto, said liquid controlling means having an actuating element therefor, valve means having a control member therefor, resilient means adapted to be urged by the driving member against the control member to close the valve means upon arrival of the driving member at one position, means hydraulically shiftable in response to closure of said valve means, for displacing the aforesaid actuating element to operate the liquid controlling means and for displacing the control member against the resilient means, whereby the driving member may return to another position without allowing the valve means to open, and means responsive to arrival of said driving member at said other predetermined position for releasing the pressure of said resilient means on the control member, to effect opening of the valve means and opposite displacement of the actuating element, for another operation of the liquid-controlling means, said hydraulically shiftable means having liquid supply means therefor and means for returning said shiftable means upon opening of the valve means.

3. In reciprocating hydraulic motor apparatus, in combination, a first displaceable member, a first expansible chamber for displacing said member, a first valve means for controlling said chamber, said first valve means having an actuating element therefor, a second displaceable member, a second expansible chamber for displacing said second member, a second valve means for controlling said second chamber, said second member being adapted, upon displacement thereof, to shift the actuating element of the first valve means to effect expansion of said first chamber, means adapted to resiliently engage said second valve means for shifting same into position to effect expansion of said second chamber, and means adapted to bring said resilient means into play when the first displaceable member is in one position and to relieve operative engagement of said resilient means with said second valve means when the first member has been displaced to a second position, said second displaceable member being adapted upon displacement by said expansion of said second chamber, to effect compression of said resilient means whereby the resilient means acts against said second displaceable member to maintain the second valve means in its aforesaid shifted position while the first displaceable member moves from its first position to its second position, each of said expansible chambers having means for supplying operating fluid under pressure thereto and each of said displaceable members having means for returning same, upon release of its associated valve means, to the position from which it was displaced by expansion of its associated expansible chamber.

4. Control means for a reciprocating expansible chamber motor, comprising valve means for controlling the motor, fluid supply means for operation of the motor under control of said valve means, an expansible control chamber having valve means for controlling the same, fluid supply means for expansion of said control chamber under control of said second-mentioned valve means, means adapted to be reciprocated by the motor, for operating the second-mentioned valve means to effect expansion of the control chamber, at the end of a motor stroke in one direction, and means displaced by the control chamber upon expansion thereof for operating the first-mentioned valve means to initiate a motor stroke in the opposite direction and for maintaining the second-mentioned valve means in control chamber expanding condition, said control chamber-displaced means including means directly shifted thereby and mechanically acting against said reciprocated means, whereby the reciprocated means is maintained in mechanical engagement with the second-mentioned valve means to keep the latter in control chamber expanding condition, and said reciprocated means including means adapted to release said second-mentioned valve means from operation of the control chamber-displaced means at the end of said opposite motor stroke, and said control chamber-displaced means having means for returning same upon release of said second-mentioned valve means.

5. Hydraulic motor apparatus comprising a member, means for reciprocating same including an expansible chamber, fluid supply means for said chamber, an outlet for said chamber, closure means for said outlet, a second expansible chamber, an outlet therefor, fluid supply means for said second chamber, closure means for said second-mentioned outlet, means operated by said member for moving said second-mentioned closure means against said second-mentioned outlet upon arrival of the member at a predetermined position, to effect expansion of said second chamber, means operated by said second chamber upon expansion thereof for moving said first-mentioned closure means against said first-mentioned outlet and for maintaining said second-mentioned closure means in closed position against the second-mentioned outlet, and means operated by the member upon arrival thereof at a second predetermined position, for releasing said second-mentioned closure means from its said closed position, said apparatus including returning means for the second chamber, for effecting release of the first-mentioned closure means from closed position, upon the aforesaid release of the second-mentioned closure means.

6. Control means for a reciprocating expansible chamber motor, comprising means adapted to be reciprocated by the motor, valve means for controlling the motor, fluid supply means for operation of the motor under control of said valve means, said valve means having an actuating element therefor, an expansible pilot chamber having valve means for control thereof, fluid supply means for expansion of said pilot chamber under control of said second-mentioned valve means, returning means for said pilot chamber, responsive to release of fluid pressure therein, a device for operating said second mentioned valve means, control means displaced by said reciprocated means, for resiliently exerting force on said device at the end of a motor stroke in one direction, to operate said second mentioned valve means for effecting expansion of the pilot chamber, and means shifted by the pilot chamber upon expansion thereof, for displacing the aforesaid actuating element to operate the first-mentioned valve means to initiate an opposite motor stroke and for shifting said device relative to the control means and against the resilience thereof, to maintain the second mentioned valve means in pilot chamber expanding condition during displacement of the control means corresponding in distance to the displacement of the said device by the pilot chamber.

7. In reciprocating hydraulic motor apparatus, in combination, a displaceable member, an expansible chamber for displacing the member, means for returning the member intermediate successive expansions of the chamber, valve means for controlling the expansion of said chamber, valve operating means comprising a second displaceable member and a valve-actuating element to be displaced thereby for operating said valve means, resilient returning means for said second member, and a second expansible chamber adapted to displace said second member against said returning means, valve means for controlling expansion of said second chamber, means operated by said first mentioned member and including resilient force-transmitting means intermediate the first-mentioned member and the second-mentioned valve means, for initiating exertion of operating force on said second-mentioned valve means to effect displacement of said second member when the first-mentioned member is at one end of its stroke, and for relieving said force on the second valve means when the first-mentioned member has been displaced to the other end of its stroke, and means for mechanically connecting said first-mentioned displaceable member with said second-mentioned valve means, said resilient force transmitting means and said connecting means being mechanically adapted, in cooperative response to the aforesaid displacement of said second member, to maintain and continue exertion of said operating force on said second-mentioned valve means, throughout the displacement of the first-mentioned member from the first-mentioned end to the other end of its stroke, and each of said expansible chambers having fluid supply means for operation thereof under control of the respective valve means.

8. In reciprocating hydraulic motor apparatus having a reciprocated member, an expansible motor chamber for driving the member in one direction, valve means for the chamber shiftable into one position to establish chamber-expanding pressure and into another position to relieve said pressure, means for returning the member intermediate successive expansions of the chamber, and fluid supply means for expansion of said chamber under control of said valve means, the combination of an expansible control chamber adapted upon expansion thereof to shift the aforesaid valve means from one position to the other, valve means for controlling the control chamber, and control means for said second-mentioned valve means including means operated by the reciprocated member upon its arrival at a predetermined position for shifting said second-mentioned valve means to effect expansion of the control chamber and cooperating means operated and displaced by said control chamber upon expansion thereof for applying force to said second-mentioned valve means to maintain same in said shifted condition, said control means including compressible force-transmitting means for taking up the displacement of the said cooperating means in its exertion of force on said second-mentioned valve means, and said control chamber having fluid supply means for expansion thereof under control of said second-mentioned valve means, and having associated returning means therefor operable upon release of said second mentioned valve means from its said shifted condition.

9. The apparatus of claim 8 in which the second-mentioned valve means comprises an outlet member for the control chamber and a closure member for the outlet member, and wherein the means operated by the reciprocated member is adapted to urge the compressible means against the closure member for shifting the latter to close the outlet member.

10. In a reciprocating hydraulic motor having valve means to effect reciprocation thereof and having reciprocating means including an expansible motor chamber, returning means, and fluid supply means for expansion of the motor chamber under control of the valve means, apparatus for operating said valve means, comprising a shiftable actuating element adapted to operate said valve means, a displaceable member, resilient returning means therefor, an expansible control chamber for displacing said displaceable member against said resilient returning means, said displaceable member being adapted to shift said actuating element for operation of said valve means, a control member adapted to be reciprocated by the motor, a valve having associated resilient control means, for controlling said control chamber and adapted to be shifted by the control member and said resilient control means at one end of the motor stroke, to effect displacement of the displaceable member in a predetermined direction, said second mentioned valve being adapted to be maintained, by said displaceable member and in response to said displacement thereof, in shifted position against said second mentioned resilient means, and means adapted to control said second mentioned resilient means, for relieving the force thereof on said second mentioned valve at the other end of the motor stroke, to permit displacement of the displaceable member in an opposite direction by the returning means, said control chamber having fluid supply means for expansion thereof under control of said second-mentioned valve.

GEORGE MARTIN BOOTH.